Feb. 13, 1923.
G. T. STRITE
1,445,418
SHOCK ABSORBING SPRING
Filed May 28, 1921
2 sheets-sheet 1
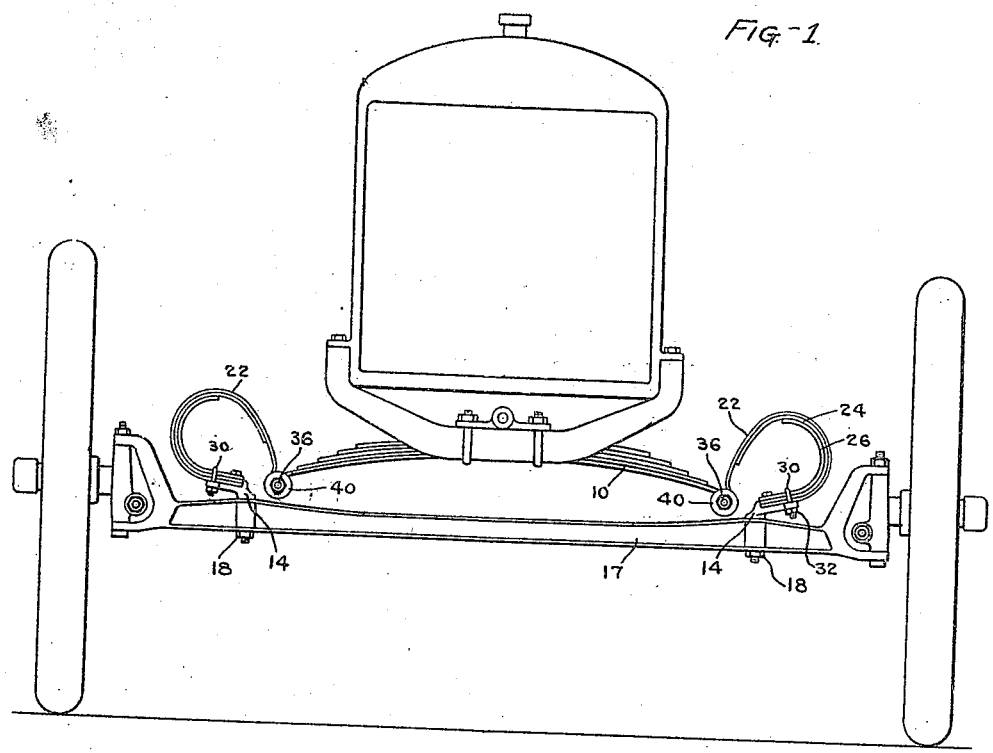
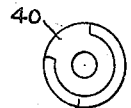
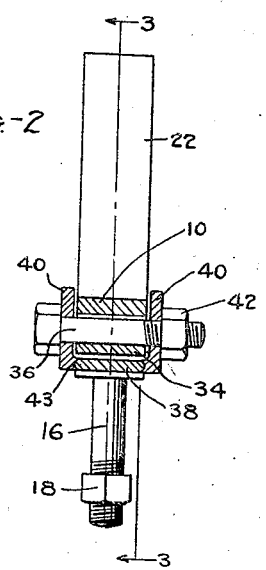
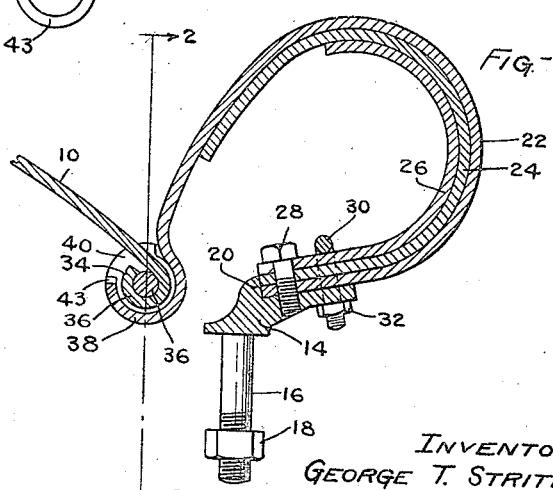
INVENTOR:
GEORGE T. STRITE.
By Whiteley and Ruckman
ATTORNEYS.

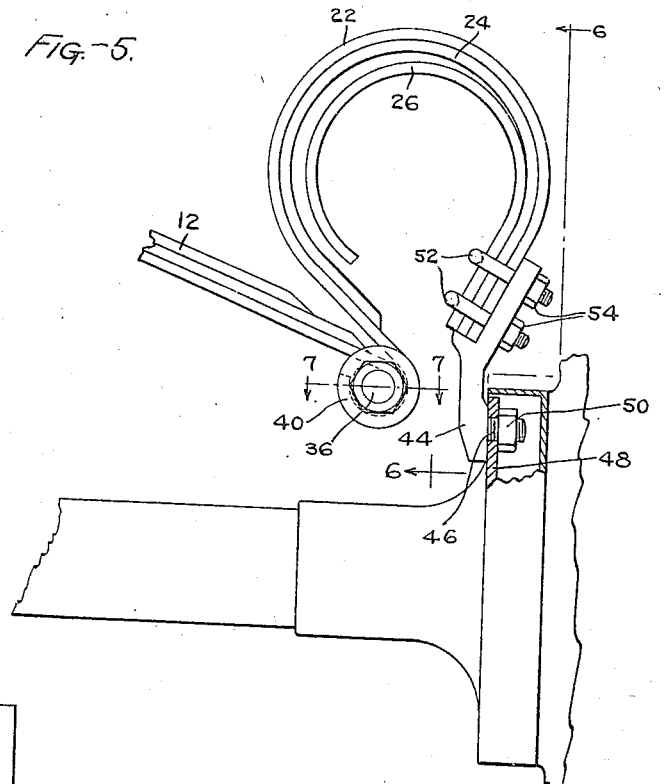
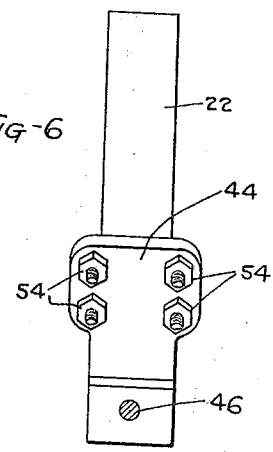
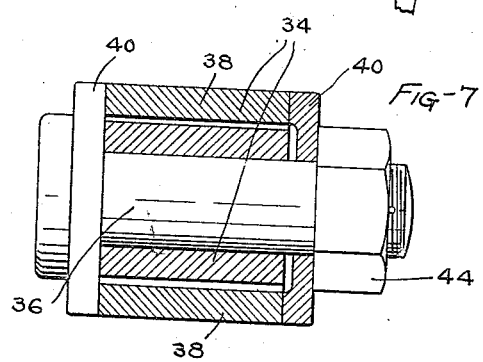

Patented Feb. 13, 1923.

1,445,418

UNITED STATES PATENT OFFICE.

GEORGE T. STRITE, OF MINNEAPOLIS, MINNESOTA, ASSIGNOR OF ONE-THIRD TO F. H. BIERMAN AND ONE-THIRD TO H. J. BIERMAN, BOTH OF MINNEAPOLIS, MINNESOTA.

SHOCK-ABSORBING SPRING.

Application filed May 28, 1921. Serial No. 473,283.

*To all whom it may concern:*

Be it known that I, GEORGE T. STRITE, a citizen of the United States, residing at Minneapolis, in the county of Hennepin and State of Minnesota, have invented certain new and useful Improvements in Shock-Absorbing Springs, of which the following is a specification.

My invention relates to shock absorbing springs, and is intended for use in connection with motor vehicles. An object is to provide a device of this character which will absorb the shocks which ordinarily occur in driving motor vehicles. Another object is to provide a device of this character which may be readily attached and used in connection with the customary transverse springs of the vehicle.

The full objects and advantages of my invention will appear in connection with the detailed description, and the novel features embodied in my inventive idea will be particularly pointed out in the claims.

In the accompanying drawings which illustrate the application of my invention, Fig. 1 is an elevational view showing my device applied to the front of an automobile. Fig. 2 is a view in section on the line 2—2 of Fig. 3. Fig. 3 is a view in section on the line 3—3 of Fig. 2. Fig. 4 is a plan view of a washer. Fig. 5 is an elevational view showing my device applied to the rear of an automobile. Fig. 6 is a view on the line 6—6 of Fig. 5. Fig. 7 is a view in section on the line 7—7 of Fig. 5.

My device is shown in the drawings applied to the customary transverse springs 10 at the front and the customary transverse springs 12 at the rear of an automobile, the device being slightly different in construction according to whether it is applied at the front or the rear. Referring first to Figs. 1 to 4 which show the device applied to the front of the vehicle, I provide a casting 14 having a depending bolt member 16 which is threaded at its lower end to receive a nut 18. In use, the bolt member 16 is passed downwardly through a vertical hole in the axle 17 and the nut 18 is then screwed on. A casting of this character is provided for use adjacent each end of the spring 10 and the bolt members 16 are adapted to be secured in the customary holes provided in the axle for receiving the usual vertical member to which a shackle connection with the transverse spring is made. The casting is provided with a shoulder 20 against which fit the outer ends of the leaves of my spring device. As shown, this device includes three leaves 22, 24, and 26. A screw bolt 28 passing through the leaves is threaded into the casting 14 and a yoke 30 passes over the leaves with its two arms passing through holes in the casting and secured by nuts 32. The leaves 22, 24, and 26 are progressively shorter in length and have a generally oval shape so that the longer leaf 22 has its inner end disposed adjacent the casting 14 but spaced inwardly therefrom. The usual curved end 34 of one of the leaves of the transverse spring 10 has a bolt 36 passed therethrough and is partly surrounded by the curved end 38 of the leaf 22. Washers 40 fit against the sides of these curved ends and the bolt 36 is held in place by a nut 42. As shown in Figs. 2 and 4, the inner margins of the washers 40 may have grooved ribs 43 extending partly around their circumference to receive the edges of the curved end 38 as shown in Fig. 3. The curved end 38 and the washers form a pocket for containing a suitable lubricant. In applying my device, the castings 14 carrying the oval springs are secured in place and the curved end 34 of the transverse spring is placed in the curved end 38 of the oval spring and secured by the bolt 36. The curvature of the oval springs is preferably such that when the transverse spring 10 occupies its normal position, the oval springs will be under considerable compression. The attachment may be readily made by lifting of the middle of the transverse spring so as to relieve the weight ordinarily carried by this spring. For application to the rear transverse spring 12, an oval spring having leaves 22, 24, and 26 similar to those already described, is applied but the outer ends of these leaves are attached to a casting 44 which is somewhat modified in order that it may be attached by a bolt portion 46 to the brake flange 48 and secured by a nut 50. The outer ends of the leaves are shown attached to this casting by two yokes 52 provided with nuts 54. The curved end 38 of the leaf 22 and the curved end 34 of the transverse spring 12 fit together and are held in the same manner as previously described, and the oval spring is readily placed under compression in the manner previously stated. If desired in order to increase the resiliency of the spring, the leaf 26 may be somewhat separated from the leaf 24, as shown in Fig. 5.

The operation and advantages of my invention will be readily understood from the foregoing description. Application to automobiles already in use may be readily made by removing the customary shackle connections and replacing them with my device, no other change being required. On account of the resiliency of the oval spring leaf, shocks will be absorbed and the occupants of the car will not be subjected to jarring and jolting which occurs with the use of ordinary springs.

I claim:

1. A device of the class described comprising a support adapted to be secured to a motor vehicle, a bowshaped spring secured at its outer end to said support, the inner end of said spring being curved to receive the curved eye-shaped end of a transverse vehicle spring, disk members fitting the sides of said curved ends and a bolt passing through said disk members and through said eye.

2. A device of the class described comprising a casting, means for securing said casting to a motor vehicle, oval-shaped spring leaves secured to said casting at their outer ends, said leaves being progressively shorter from the outer to the inner one and the latter having its inner end curved to receive the curved eye-shaped end of a transverse vehicle spring, disk members fitting the sides of said curved ends, and a bolt passing through said disk members and through said eye.

3. A device of the class described comprising a casting, a bolt extending from one end of said casting for securing the latter to a motor vehicle, the other end of said casting being provided with a flat inwardly shouldered portion disposed at an angle to the direction of said bolt, oval-shaped spring leaves secured to said flat portion at their outer ends, and means for attaching the inner end of the oval spring to the end of a transverse vehicle spring.

4. A device of the class described comprising a casting, means for securing said casting to a motor vehicle, oval-shaped spring leaves secured to said casting at their outer ends, the inner end of the outer leaf being curved to receive the curved end of a transverse vehicle spring, washers fitting the sides of said curved ends, and a bolt passing through said washers and adapted to lie within the curved end of the transverse spring.

5. A device of the class described comprising a casting, means for securing said casting to a motor vehicle, oval-shaped spring leaves secured to said casting at their outer ends, the inner end of the outer leaf being curved to receive the curved end of a transverse vehicle spring, disk members fitting the sides of said curved ends whereby a pocket for receiving lubricant is formed in connection with the curved end of said leaf, and means for securing said curved ends together for cooperative movement.

In testimony whereof I hereunto affix my signature.

GEORGE T. STRITE.